March 21, 1933. G. A. PRIOR 1,902,180
GAUGE FOR DETERMINING PITCH OF PROPELLER BLADES
Filed Dec. 3, 1930
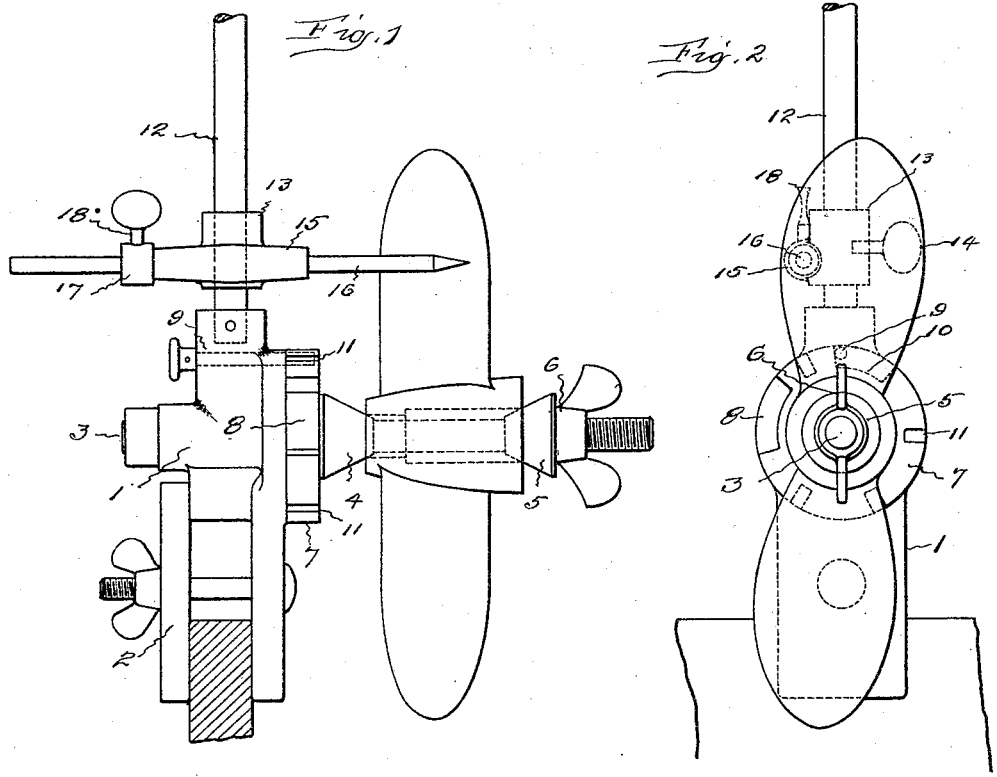
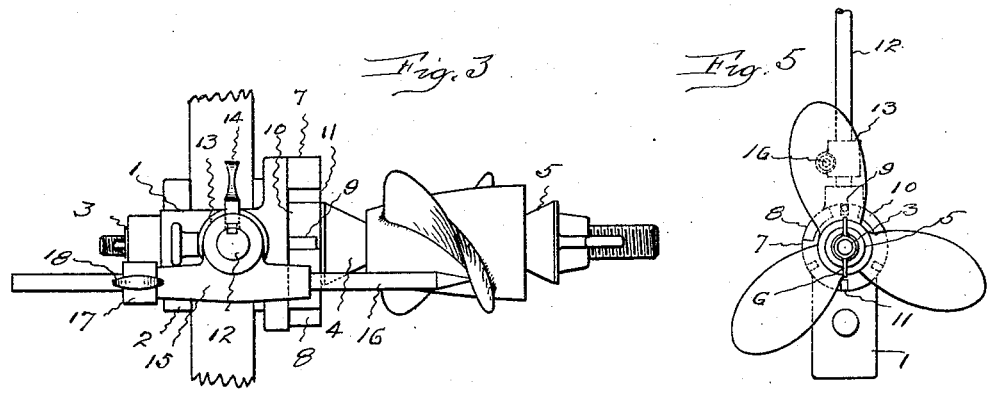
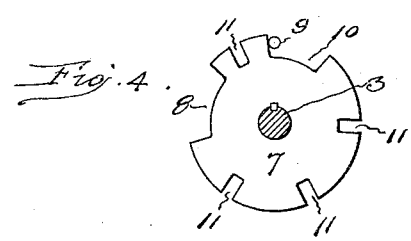
INVENTOR
George A. Prior, by
Harry R. Williams
atty.

Patented Mar. 21, 1933

1,902,180

UNITED STATES PATENT OFFICE

GEORGE A. PRIOR, OF WEST HARTFORD, CONNECTICUT, ASSIGNOR TO THE GRAY & PRIOR MACHINE COMPANY, OF HARTFORD, CONNECTICUT, A CORPORATION OF CONNECTICUT

GAUGE FOR DETERMINING PITCH OF PROPELLER BLADES

Application filed December 3, 1930. Serial No. 499,647.

This invention relates to a gauge that is more particularly designed for use in ascertaining the pitch of propeller wheels, or for checking the measurements of several blades to learn if they are of the same pitch, or for ensuring the correction of blades that have been bent or damaged in use.

The object of the invention is to provide an inexpensive tool which is simple to manipulate for the above stated purposes and to which propellers of various pitches, diameters, number and width of blades may be quickly applied, and the relations of the blade surfaces to the axes definitely ascertained.

In the embodiment of the invention illustrated there is a supporting bracket with a rotatable shaft to which the propeller is designed to be detachably clamped. On the shaft is a collar with several angularly positioned index notches adapted to receive a registering pin held by the bracket. Extending vertically from the bracket is a post on which is a vertically adjustable sleeve that carries a horizontally movable pointer which is provided with a horizontally adjustable gauge collar. A propeller being clamped to the shaft, and the index collar properly engaged by the locating pin, the pointer is adjusted vertically and set and then moved horizontally into engagement with a selected point on the blade. The gauge collar is set on the pointer against the bracket, then the pointer is withdrawn horizontally and the propeller rotated, or another blade is swung into the same position, and the pointer again moved against the blade. The position of the indicating collar with relation to its original position is then measured in order to determine the factor sought.

Fig. 1 of the accompanying drawing shows a side elevation of the gauge and a two-bladed propeller applied thereto. Fig. 2 shows an elevation looking toward the back of the propeller and gauge. Fig. 3 shows a top view. Fig. 4 shows a face view of the index collar. Fig. 5 shows on smaller scale the gauge with a three-bladed propeller applied.

The bracket 1 at its lower end has a clamp 2 for the purpose of fastening the tool to a bench, board, or part of the structure to which the propeller to be gauged is applied. The shaft 3 is journalled in suitable bearings in the bracket so as to extend horizontally. On the shaft are two opposed cones 4 and 5, and the outer end of the shaft is threaded and provided beyond the cones with a thumb nut 6. The propeller to be gauged is thrust on the shaft between the cones and is clamped to them by turning up the thumb screw. The clamp members 4 and 5 being conical, propellers that have different sizes of bores in their hubs may thus be fastened to the shaft.

Fastened to the shaft adjacent to the face of the bracket is an index collar 7. The periphery of this collar has a plurality of angularly positioned notches. Extending through the bracket and adapted to be pushed into and drawn out of these notches in the collar is a registering pin 9.

In the preferred form of the gauge illustrated when the registering pin is in either of the notches 11, which are located two 180° and three 120° apart in the periphery of the index collar, the collar, shaft and propeller clamped thereon are held from rotatory movement. The notch 8 is of such a width that when the registering pin is therein the collar, shaft and propeller may be rotated 45° or one-eighth of a revolution, and the width of the notch 10 is of such a width that when occupied by the registering pin the collar, shaft and propeller may be rotated 36° or one-tenth of a revolution.

Extending upward from the bracket is a post 12. Fitted to move up and down on the post is a sleeve 13 that after it has been adjusted to the desired height may be secured by the thumb screw 14. Fitted to be moved horizontally through a sleeve 15 which is integral with the sleeve 13, is a pointer 16. Adjustable on the pointer is a collar 17 that may be fastened at any required locality along the pointer by a thumb screw 18.

In comparing the blades of a two-blade propeller the registering pin is entered into one groove 11 in the index collar and the propeller is loosened so that it can be rotated on the cones to bring the point on the blade desired to be gauged opposite the pointer, after which the propeller is clamped to the shaft. The collar 17 on the pointer is loosened and the pointer slid against the surface of the blade and then the collar is pushed against the end of the sleeve 15 and clamped to the pointer.

The pointer is then withdrawn, the registering pin removed from the groove in the index collar, the propeller turned over so that the other blade is up and the registering pin inserted in the groove opposite to that it first occupied, after which the pointer is pushed against the surface of this blade at a point diametrically opposite that at which it engaged the other blade. If the blades are uniform, when the pointer engages the blade the collar 17 on the pointer will again bear against the end of the sleeve 15. Should there be a variation in the blades at diametrically opposite points this variation will show by a space between the collar and the end of the sleeve. These steps may be repeated over all points of the surface of the blades, as the pointer slides freely horizontally and can be adjusted vertically on the post to allow this. If the blades are exactly alike the collar on the pointer will, when the pointer is engaged with similar diametrically opposite points on the blades, always butt against the end of the sleeve. If the propeller has three blades the registering pin is engaged successively with the three different notches 11 that are 120° apart and the same steps repeated. For determining the pitch of the propeller, or ascertaining whether the pitches of the blades are alike, the registering pin is entered into either the notch 10 or the notch 8. The index collar is turned against one end wall of the notch and the propeller locked on the shaft with the pointer engaged with its surface adjacent to the far edge, and the collar 17 fastened on the pointer against the end of the sleeve 15. The pointer is then withdrawn and the propeller and index collar turned until the registering pin engages with the opposite edge of the notch in the index collar. The pointer is then pushed into contact with the surface of the blade adjacent to the near edge and the distance of the collar 17 away from the end of the sleeve 15 is measured. If the registering pin is in the notch 10 the measurement obtained is multiplied by the constant 10, or if the pin is in the notch 8 the measurement is multiplied by the constant 8, which gives the pitch for the complete 360°, for, as before pointed out, the index collar and propeller are rotatable 36°, or one-tenth of the circumference, if the pin is in the notch 10, and if the pin is in the notch 8 the index collar and propeller are capable of being turned 45° or one-eighth of a complete revolution.

With this gauge the pitch of a propeller may be quickly ascertained, and two or more blades compared. Should the pitches of blades vary or should one blade be damaged, the blade that is out of true may be worked until the defect is shown by this gauge to be rectified.

The invention claimed is:

1. A propeller gauge which comprises a bracket, a shaft rotatably supported by said bracket, means for clamping a propeller on said shaft, a collar having a plurality of angularly spaced index recesses rotatable with the shaft, a registering pin movably supported by the bracket and adapted to be selectively entered into said recesses, a post extending from the bracket, a sleeve adjustable on said post, a pointer supported by said sleeve and adapted to be moved in a direction parallel to the shaft, and an indicating collar adapted to be adjusted along and fastened to said pointer.

2. A propeller gauge which comprises a bracket, a shaft rotatably supported by and extending horizontally from said bracket, means for clamping a propeller on said shaft, an index collar having a plurality of angularly spaced notches in its periphery rotatable with the shaft, a registering pin movably supported by the bracket and adapted to be selectively entered into said notches, a post extending vertically from the bracket, a sleeve vertically adjustable on and adapted to be secured to said post, a horizontally adjustable pointer supported by said sleeve, and a collar adapted to be adjusted along and fastened to said pointer and engaged with said sleeve.

3. A propeller gauge which comprises a bracket, a shaft rotatably supported by said bracket, means for clamping a propeller on said shaft, an index collar rotatable with the shaft and having in its periphery sets of notches angularly spaced 120° and 180° apart respectively, a registering pin movably supported by the bracket and adapted to be selectively entered into said notches, a post extending from the bracket, a sleeve adjustable on said post, a pointer supported by said sleeve and adapted to be moved in a direction parallel to the shaft, and an indicating collar adapted to be adjusted along and fastened to said pointer.

4. A propeller gauge which comprises a bracket, a shaft rotatably supported by said bracket, means for clamping a propeller on said shaft, an index collar rotatable with the shaft, said collar having a notch in its periphery, a registering pin movably supported by the bracket and adapted to be entered into the index notch, said notch and pin allowing the index collar to be rotated a definite number of degrees, a post extending from the bracket, a sleeve adjustable on said post, a pointer supported by said sleeve and adapted to be moved in a direction parallel to the shaft, and an indicating collar adapted to be adjusted along and fastened to said pointer.

5. Means for gauging propeller blades which comprises a supporting bracket, a shaft rotatably supported by and extending from said bracket, conical clamps for centering, supporting and fastening a propeller on said shaft, an index collar rotatable with the shaft, said collar having a plurality of angularly spaced notches in its periphery, a registering pin movably supported by the bracket and adapted to be selectively entered into said notches, a post extending from the bracket, a sleeve adjustable on and adapted to be secured to said post, a pointer supported by said sleeve and adapted to be moved in a direction parallel to the shaft, and a collar adapted to be adjusted along and fastened to said pointer and engaged with a portion of said sleeve.

6. A propeller gauge comprising a bracket, a shaft rotatably supported by the bracket, means for clamping a propeller on said shaft, a peripherally notched collar rotatable with the shaft, means movably supported by the bracket and adapted to be selectively engaged with the notches in the collar and register said collar and shaft with respect to the bracket, a post fixed to and extending from the bracket, a sleeve adjustable on said post radially with respect to said shaft, and a gauging pointer supported by said sleeve and adapted to be adjusted in a direction parallel to the shaft.

7. A propeller gauge comprising a bracket, a shaft rotatably supported by the bracket, means for clamping a propeller on said shaft, a collar having a plurality of angularly spaced recesses in the periphery thereof rotatable with the shaft, a registering pin removably held by the bracket and adapted to be selectively entered into said recesses, a post fixed to and extending from the bracket, a sleeve adjustable longitudinally of said post, and a gauging pointer supported by said sleeve and adapted to be adjusted in a direction parallel to the shaft.

GEORGE A. PRIOR.